United States Patent
Dolgopolsky et al.

(10) Patent No.: US 8,889,574 B2
(45) Date of Patent: Nov. 18, 2014

(54) FOAM LAMINATE PRODUCT AND PROCESS FOR PRODUCTION THEREOF

(75) Inventors: Inna Dolgopolsky, Richmond Hill (CA); Yolanda Sadl, Moorpark, CA (US); Lisa Pileggi, Newmarket (CA); Petar Pepic, Toronto (CA)

(73) Assignee: Proprietect, L.P. (CA)

( * ) Notice: Subject to any disclaimer, the term of this patent is extended or adjusted under 35 U.S.C. 154(b) by 1360 days.

(21) Appl. No.: 11/913,059

(22) PCT Filed: Apr. 27, 2006

(86) PCT No.: PCT/CA2006/000631
§ 371 (c)(1),
(2), (4) Date: Aug. 25, 2008

(87) PCT Pub. No.: WO2006/116842
PCT Pub. Date: Nov. 9, 2006

(65) Prior Publication Data
US 2008/0311336 A1     Dec. 18, 2008

Related U.S. Application Data

(60) Provisional application No. 60/675,901, filed on Apr. 29, 2005.

(51) Int. Cl.
*B32B 5/28* (2006.01)
(Continued)

(52) U.S. Cl.
CPC . *B32B 5/18* (2013.01); *B32B 5/245* (2013.01); *B29C 43/203* (2013.01);
(Continued)

(58) Field of Classification Search
USPC ............. 442/22, 30, 55, 221, 224, 225, 315, 442/370, 373, 374, 394–399; 428/36.5, 428/304.4, 318.4–318.8
See application file for complete search history.

(56) References Cited

U.S. PATENT DOCUMENTS 3,506,532 A * 4/1970 Bock et al. ............... 428/31
4,056,161 A   11/1977 Allen, Jr.
(Continued)

FOREIGN PATENT DOCUMENTS

CA     2113834     2/1993
CA     2533692     2/2005
(Continued)

OTHER PUBLICATIONS

"Polyurethane Foam as an Integral Core Component of Automotive Headliner" by I. Dolgopolsky and J.A. Duley, Polyurethanes Expo '99, Sep. 12-15, 1999.*

(Continued)

*Primary Examiner* — Jennifer A Steele
(74) *Attorney, Agent, or Firm* — Katten Muchin Rosenman LLP

(57) ABSTRACT

A laminate product comprising a foam core having a pair of opposed major surfaces and a cover layer secured with respect to each major surface is described. The cover layer comprises a polymeric substrate having disposed therein a plurality of reinforcing fibrous material. It has been found that it is possible to produce a foam laminate product having improved stiffness if a lower amount of reinforcing material is used for a given amount of polymer substrate. In particular, it has been found possible to provide an improved foam laminate product having a relatively high ratio of stiffness to weight of reinforcing fibrous material. It has been further discovered that the stiffness of the resulting foam laminate product can be increased when the polymer substrate and the reinforcing fibrous material are present in a weight ratio of greater than 2.5. This is believed to be the result of improved encapsulation of the reinforcing fibrous material by the polymer substrate.

20 Claims, 1 Drawing Sheet

(51) Int. Cl.
   *B32B 5/18* (2006.01)
   *B32B 5/22* (2006.01)
   *B32B 5/24* (2006.01)
   *B29C 43/20* (2006.01)
   *B32B 3/26* (2006.01)
   *B32B 5/02* (2006.01)
   *B32B 19/04* (2006.01)
   *B32B 27/06* (2006.01)
   *B32B 27/12* (2006.01)
   *B32B 27/32* (2006.01)
   *B60R 21/04* (2006.01)
   *B29K 105/08* (2006.01)
   *B29L 31/30* (2006.01)
   *B60R 13/02* (2006.01)

(52) U.S. Cl.
   CPC   *B29K 2105/0854* (2013.01); *B29L 2031/3041* (2013.01); *B32B 3/26* (2013.01); *B32B 5/022* (2013.01); *B32B 5/024* (2013.01); *B32B 19/045* (2013.01); *B32B 27/065* (2013.01); *B32B 27/12* (2013.01); *B32B 27/32* (2013.01); *B32B 2250/05* (2013.01); *B32B 2250/40* (2013.01); *B32B 2262/0284* (2013.01); *B32B 2262/106* (2013.01); *B32B 2266/0278* (2013.01); *B32B 2274/00* (2013.01); *B32B 2307/102* (2013.01); *B32B 2307/54* (2013.01); *B32B 2307/546* (2013.01); *B32B 2307/56* (2013.01); *B32B 2307/718* (2013.01); *B32B 2307/72* (2013.01); *B32B 2605/00* (2013.01); *B32B 2605/08* (2013.01); *B60R 13/0225* (2013.01); *B60R 21/04* (2013.01); *B60R 2021/0442* (2013.01)
   USPC ............... 442/373; 428/318.4; 428/318.8; 428/319.1; 428/319.3; 428/319.9; 442/221; 442/224; 442/225; 442/226; 442/370

(56)   References Cited

U.S. PATENT DOCUMENTS

| 5,049,439 | A | * | 9/1991 | Robinson | 442/225 |
| 5,374,383 | A |   | 12/1994 | Brambach | |
| 5,451,451 | A |   | 9/1995 | Minnick | |
| 5,635,271 | A | * | 6/1997 | Zafiroglu | 428/102 |
| 5,679,432 | A |   | 10/1997 | Holmquest et al. | |
| 6,368,702 | B1 | * | 4/2002 | Erickson | 428/292.1 |
| 2004/0234744 | A1 | * | 11/2004 | Byma et al. | 428/304.4 |

FOREIGN PATENT DOCUMENTS

| EP | 264495 | 4/1998 |
| EP | 1 359 089 A2 | 11/2003 |
| JP | 10166467 | 6/1998 |

OTHER PUBLICATIONS

International Search Report (3 pages), issued for the corresponding application PCT/CA2006//000631 mailed Sep. 11, 2006.
Supplementary European Search Report for European Patent Application No. EP 06 74 1399, mailed Nov. 18, 2009.
Japanese Office Action dated Feb. 14, 2013.
Japanese Office Action dated Apr. 2, 2013.

* cited by examiner

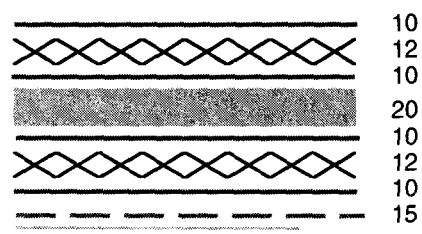
FIGURE 1 – PRIOR ART
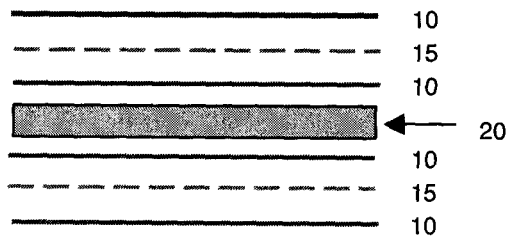
FIGURE 2

FOAM LAMINATE PRODUCT AND PROCESS FOR PRODUCTION THEREOF

FIELD OF THE INVENTION

In one of aspects the present invention relates to a foam laminate product, more particularly such a product adapted for use in the interior of a vehicle. In another of its aspects, the present invention relates to process for the production of a foam laminate product. In a highly preferred embodiment, the present invention relates to a headliner, more particularly a vehicular headliner. In this preferred embodiment, an aspect of present invention relates to process for the production of a headliner.

DESCRIPTION OF THE PRIOR ART

Energy absorbing devices (also known as energy management devices) and structural devices are known. Such devices can take one of a variety of shapes and forms. Currently, one of the major applications for energy absorbing devices and/or structural devices is in vehicles, particularly automobiles. Such devices, when used in vehicles, would be of great convenience if they could be included in or substituted for trim panel and, indeed, are commonly referred to as trim panels.

In recent years, one particularly useful application of such energy absorbing devices and/or structural devices which has developed is in vehicular headliners. Vehicular headliners are generally known in the art. More particularly, automotive headliners are generally known in the art. In many case an automotive headliner will serve as a structural device and a device which combines both structural and energy absorbing properties.

As is known such automotive headliners are used to line the roof of the automobile. Conventionally, an automotive headliner is a laminate structure comprising, for example, a foam or other padded element having a cover material secured thereto. The cover material comprises a finished outer surface that faces the interior of the automobile and this the cover material is disposed adjacent or is comprised in the so-called A-surface of the headliner. The surface of the headliner adjacent the A-surface is the so-called B-surface. The B-surface of the headliner may or may not comprise a cover material.

Conventionally, foamed automotive headliners have made produced from isocyanate-based foams such as polyurethane foams.

When producing automotive headliners from polyurethane foams, it is conventional to utilize the so-called free-rise or slab polyurethane foams.

In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for foam production into a mixhead equipped with a stirrer (or other suitable agitation means) at a pressure generally less than 500 psi (usually 200-350 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as 4 feet (height)×6 feet (width)×100 feet (length). Each bun is then cut into a plurality shorter length (e.g., 5 feet) buns, depending on the specifications of the particular automotive headliner being produced. The shorter length bun is then sliced into sheets of appropriate thickness (e.g., ⅛ to ½ inches). Each sheet is then covered, trimmed and secured in the automobile. It is also known in the art to subject each sheet to further processing steps such as thermoforming so to confer to the planar sheet a slightly contoured appearance which more closely assumes the shape of the roof of the automobile.

Thus, slabstock polyurethane foam conventionally used in the production of automotive headliners is known as a foam (e.g., a resilient foam) having at least one uncontoured surface (i.e., the foam is a "free-rise" foam).

U.S. Pat. Nos. 5,683,796 and 5,721,038 [both to Kornylo et al. (Kornylo)] teach a vehicular headliner made from molded polyurethane foam. The headliner taught by Kornylo purportedly comprises a substantially constant density while having central sections with a greater cross-sectional thickness than peripheral portions. The central sections must be relatively thick such that the headliner possesses acceptable sound absorbing properties while the peripheral portions must be relatively thin so as to facilitate securing of the headliner to the roof of the automobile.

International Publication Number WO 02/42119 [Zolfaghari] teaches an improvement to the headliner taught by Kornylo. Specifically, Zolfaghari teaches a vehicular headliner comprising energy management capabilities to improve vehicle occupant safety.

Regardless of the precise mode of production, it is conventional to reinforce the headliner using a reinforcing additive such as fibreglass, typically typically in the form of a fibreglass mat or chopped fibreglass.

For example, if the headliner is produced from slabstock foam, it is conventional to initially form a blank comprising a foam core, an adhesive layer on both sides of the foam core and fibreglass mat layer or chopped fibreglass on each adhesive layer (the blank may also comprise other layers such as a trim cover and the like). The blank is then subjected to a forming operation which serves to shape the foam core and adhere the fibreglass mats to each surface of the shaped foam core. Conventional forming operations include thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

Another reinforcement approach is taught in United States patent publications US2004/0234744 [Byma et al. (Byma #1)], US2004/0235377 [Byma et al. (Byma #2)] and US2004/0235378 [Byma et al. (Byma #3). The purported point of novelty in Byma #1, Byma #2 and Byma #3 relates to the use of basalt fibers to replace conventionally used fibreglass thereby improving the recyclability of the laminate product. Byma #1 teaches a laminate product comprising a polyurethane foam core having disposed on opposed surfaces thereof a series of thermoplastic binder layers and basalt reinforcement layers. Byma #2 teaches a laminate product comprising a (non-foam) core containing basalt fibers and a polypropylene binder. Byma #3 teaches a laminate product comprising a polyurethane foam core having disposed on opposed surfaces thereof a series of liquid adhesive layers and basalt reinforcement layers.

International Publication Number WO2005/011974 [Dolgopolsky et al. (Dolgopolsky)] teaches a laminate product comprising a foam core having a pair of opposed major surfaces and a cover layer secured with respect to each major surface is described. The cover layer is essentially free of fibreglass and comprises a polymeric substrate having disposed therein a plurality of porous material layers. In a preferred embodiment of the invention, the porous material layer has a tensile modulus less than that of fibreglass mat yet can be used to produce a foam laminate product having significantly higher strength properties.

Regardless of the specific reinforcement technique utilized, the conventional wisdom in the art has been that the degree of reinforcement (e.g., stiffness) achieved is directly proportional to the amount reinforcing material (e.g., fiber glass and other fibrous material) added.

Thus, there is a need for a vehicular foam part, such as a vehicular headliner, which can be made with less amounts of reinforcing material without significant loss of energy management and/or structural properties. It would be highly desirable if such a foam part could be made using relatively inexpensive materials on existing equipment thereby minimizing or eliminating the need for extra capital expenditure.

SUMMARY OF THE INVENTION

It is an object of the present invention to obviate or mitigate at least one of the above-mentioned disadvantages of the prior art.

Accordingly, in one of its aspects, the present invention provides a laminate product comprising a foam core having a pair of opposed major surfaces and a cover layer secured with respect to each major surface, the cover layer comprising a polymeric substrate and a fibrous material, wherein the polymeric substrate and the fibrous material are present in a weight ratio of greater than 2.5:1.

In another of its embodiments, the present invention provides a vehicular headliner comprising an A-surface disposed to face an interior of a vehicle and a B-surface substantially opposed to the A-surface, the headliner comprising: a foam element having an compression force deflection at 10% deflection in the range of from about 5 pounds to about 200 psi when measured pursuant to ASTM 3574-D, a first cover layer secured with respect to the A-surface, and a second cover layer secured with respect to the B-surface; wherein each of the first cover layer and the second cover layer comprises a polymeric substrate substantially encapsulating a fibrous layer, the polymeric substrate and the fibrous material being present in a weight ratio of greater than 2.5:1.

In yet another of its aspects, the present invention provides a process for producing a laminate foam product having a pre-determined shape, the process comprising the steps of:

positioning a blank in a shaping device, the blank comprising a foam core having a pair of opposed major surfaces and a cover layer disposed on each major surface, the cover layer comprising at least one pair of alternating layers of a polymeric layer and a fibrous layer, the polymeric layer and the fibrous material being present in a weight ratio of greater than 2.5:1; and subjecting the blank to a temperature of at least about 100° C. in the shaping device at a pressure sufficient to cause: (i) the polymeric layers to form a polymeric substrate in which the fibrous layers is disposed, and (ii) the foam core to assume the pre-determined shape.

Thus, the present inventors have discovered a novel reinforcement technique for foam laminate products. Specifically, the inventors have discovered that it is possible to produce a foam laminate product having improved stiffness if a lower amount of reinforcing agent is used for a given amount of polymer substrate. This is a highly surprising result since the conventional wisdom has been that addition of more reinforcing material will confer increased reinforcement (e.g., stiffness) to the resulting foam laminate. In particular, it has been found possible to provide an improved foam laminate product having a relatively high ratio of stiffness to weight of reinforcing material. This is in additionally a highly surprising result.

While not wishing to be bound by any particular theory or mode of action, it is believed that the improvements in stiffness achieved by the foam laminate product of the present invention results from substantially complete encapsulation of reinforcing material by the polymer substrate. This is more difficult to achieve if the amount of reinforcing material is high with respect to the amount of polymer substrate. The present inventors have discovered that, by selecting the appropriate relative amounts of polymer substrate and fiber reinforcing material, the stiffness of the resulting foam laminate product can be increased and this is believed to be the result of improved encapsulation of the fiber reinforcing material by the polymer substrate.

While a preferred embodiment of the present invention is directed to application in vehicular foam parts, such as vehicular headliners, it will be appreciated by those of skill in the art that scope of the invention is not restricted to such applications. Thus, it may be possible to use the invention in other applications such as floorboards, cargo vehicle mats, Tonneau covers, and other applications where it is desirable to have a relatively lightweight article which has energy absorbing and/or structural properties equivalent to articles made using fibreglass reinforcement but avoids the use of fibreglass.

BRIEF DESCRIPTION OF THE DRAWINGS

Embodiments of the present invention will be described with reference to the accompanying drawings, wherein like reference numerals denote like parts, and in which:

FIG. 1 illustrates a schematic of a prior art foam laminate product; and

FIG. 2 illustrates a schematic of foam laminate product in accordance with a preferred embodiment of the present invention.

DETAILED DESCRIPTION OF THE PREFERRED EMBODIMENTS

The preferred foam for use in the core portion of the present laminate product is a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

Typically, the foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described herein. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$Q^1(NCO)_i]_j$$

wherein both i and j are integers having a value of 2 or more, and Q' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

If the core portion is to comprise a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 100 and a functionality of from 1 to 25. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the foamed isocyanate-based polymer core portion typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

To produce the core portion made from a foamed isocyanate-based polymer, a catalyst is usually incorporated in the reaction mixture. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Preferably, the foam core portion of the present laminate product comprises an compression force deflection at 10% deflection in the range of from about 2 psi to about 200 psi when measured pursuant to ASTM 3574-D, more preferably in the range of from about 5 psi to about 100 psi when measured pursuant to ASTM 3574-D most preferably, in the range of from about 10 psi to about 80 psi when measured pursuant to ASTM 3574-D. Throughout this specification, when reference is made to ASTM 3574-D, the test sample has the following dimensions: 2 ft.×2 ft.×1 in. (last dimension is the thickness).

Non-limiting and preferred examples of suitable polyurethane foams for use in producing the present headliner are available from Woodbridge Foam Corporation under the tradename Stratas.

Generally, the polyurethane foam suitable for use in the present headliners and having desirable energy management and/or structural characteristics may be produced from the following general non-limiting formulation:

| Component | Amount |
| --- | --- |
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| $H_2O$ | 0.5 to 25 parts/100 parts total polyol |
| Isocyanate | Adequate quantity for an index of from about 0.60 to 1.30 ratio of NCO equivalents to the equivalents of NCO reactive sites. |

Suitable crosslinkers, catalysts and silicone surfactants are described in U.S. Pat. Nos. 4,107,106 and 4,190,712.

The preferred polyurethane foam suitable for use in the present headliner may be produced from the following formulation:

| Component | Amount |
| --- | --- |
| Polymer Polyol | 20-100 parts |
| Polyol | 0-80 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| $H_2O$ | 1.75-2.75 parts/100 parts total polyol |
| Isocyanate | Adequate quantity for an index of from about 0.8 to 1.1 ratio of NCO equivalents to the equivalents of NCO reactive sites. |

The foam core in the present laminate product may have a substantially uniform density—this is typically a characteristic of a molded foam (i.e., a foam produced by constraining the expanding mass on all surfaces as it is converted to the foam product). Alternatively, and preferably, the foam core has a variable density—this is typically a characteristic of a slab foam (i.e., a foam produced by a process in which at least one surface of the expanding mass is unconstrained so that the mass may "free rise" as it is converted to the foam product) after conventional forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

Preferably, the foam core in the present laminate product has a density in the range of from about 0.5 to about 30 pounds per cubic foot, more preferably in the range of from about 1 to about 20 pounds per cubic foot, even more preferably in the range of from about 2 to about 15 pounds per cubic foot, most preferably in the range of from about 2 to about 8 pounds per cubic foot.

The present laminate product further comprises a cover layer disposed on opposed surfaces of the foam core portion. Each cover layer comprises a polymer substrate and a plurality of porous material layers.

Preferably, the polymeric substrate comprises an organic polymer.

In one preferred embodiment, the polymeric substrate comprises thermoplastic polymer. In another preferred embodiment, the polymeric substrate comprises an elastomeric material. In yet another preferred embodiment, the polymeric substrate comprises a thermosetting material (e.g., epoxy, polyurethane, polyurea, phenolics, acrylates, arylates, silicones, polysulfides, polyesters or mixtures of two or more of these).

Non-limiting examples of useful polymer substrates may be selected from the group comprising polyolefins, polyesters, nylons, poly(vinyl chloride), polyurethanes, polyacrylates, latex, styrene-butadiene polymers, nitrile-butadiene polymers, silicone polymers, mixtures thereof, copolymers thereof and interpenetrating networks thereof.

Preferably, the polymeric substrate comprises a polyolefin. More preferably, the polymeric substrate comprises polyethylene, polypropylene, butyl rubber and mixtures thereof. Most preferably, the polymeric substrate comprises polyethylene, polypropylene and mixtures thereof.

In one embodiment, the fibrous material comprises a woven fibrous material. In another embodiment, the fibrous material comprises a non-woven fibrous material.

Further information on such materials may be found on the following websites: http://www.nonwovens-group.com, http://www.johnrstarr.com and http://www.inda.org.

The fibrous material may be made from a polymer, such as an organic polymer. Further, the fibrous material may naturally occurring or synthetic.

Preferably, the fibrous material is selected from the group consisting of glass, basalt, carbon, polyester, ceramic polyamide, polyimide, rayon, metal alloys, mixtures of any of these copolymers of any of these, hybrids of any of these and interpenetrating networks of any of these.

In one embodiment, the polyester may based on terephthalic acid. In a more preferred embodiment, the polyester comprises poly(ethylene terephthalate).

In another embodiment, the polyester comprises a poly (aromatic ester). In a more preferred embodiment, the poly (aromatic ester) is selected from the group consisting of Kevlar™, Aramide™, Nomex™, Spandex™ and mixtures thereof.

It is highly preferred that the fibrous material be in the form of a porous material layer such as a veil, a mat or the like. More particularly, it is highly preferred to utilize such a porous material layer that, in cross-section, has a thickness of a single fiber for a significant portion of the surface area of the porous material (e.g., except at the cross-over points in the case of a woven material).

In this, highly preferred embodiment, the porous material layer used in each cover layer may be the same or different. Preferably, the porous material layer used in each cover layer is the same.

It is most preferred to use a single porous material layer in each cover layer. Alternatively, although less preferred, it is possible to use a plurality of porous material layers. For example, it is possible to use in each cover layer from 2 to 15 porous material layers, even more preferably from 2 to 12 porous material layers, even more preferably from 2 to 10 porous material layers, most preferably from 4 to 8 porous material layers.

The preferred method for producing the present laminate product will now be discussed. Prior to this discussion, there will be a brief discussion of the prior art approach to producing a vehicular headliner.

Thus, with reference to FIG. 1, there is illustrated in schematic form, the various layers of materials used in the production of a conventional headliner product. These components include a foam core 20 having its major surfaces covered by two cover layers. Each cover layer consists of a single fibreglass mat 12 interposed between a pair of polymer layers 10. One of the cover layers also includes a scrim layer 15. When it is desired to produce the vehicular headliner material, a stack or blank containing the layers described above is placed in a conventional thermoforming device (or other a shaping device) after which the stack or blank is subjected to heat and pressure for a sufficient time such that polymer layers 10 serve to permeate into fibre glass mat 12 and also serve to adhere the cover layers to foam core 20. Concurrently, foam core 20 is shaped to the desired shape of the vehicular headliner. Typically, the weight ratio of polymer layers 10 (aggregate weight) to fibre glass mat 12 (aggregate weight) is 1:1, with 0.8:1 being very typical With reference to FIG. 2, there is illustrated, in schematic form, the layers used in a preferred embodiment of the present laminate product. As shown, fibreglass mat 12 used in FIG. 1 has been replaced so that the resulting laminate product contains no fibreglass component in the cover layer adjacent to each major surface of the foam core.

Thus, the major surfaces of foam core 20 are covered by a cover layer. In the illustrated embodiment, each cover layer consists of two polymer layers 10 between which is interposed a fibrous porous material layer 15. Those of skill in the art will appreciate that, for a given cover layer, it is possible to have pairs of polymer layer 10 and porous material layer 15 with an extra polymer layer 10 to create a stack or blank having N porous material layers and N+1 polymer layers. Foam core 20, polymer layers 10 and porous material layers 15 may be selected from the materials described hereinabove.

When it is desired to produce the present laminate product, a stack or blank similar to the one shown in FIG. 2 is disposed in a conventional forming or shaping device such as a device capable of carry out forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

The stack or blank is then subjected to a temperature of at least about 100° C. in the shaping device at a pressure and for period of time sufficient to cause polymeric layers 10 to form a polymeric substrate in which porous layers 15 are disposed. Concurrently, foam core 20 assumes the pre-determined shape (contoured or planar) of the laminate product. Thus, during the process, each of polymer layers 10 permeates into adjacent porous material layer 15 with the result that porous material layers 15 are substantially completely encapsulated by the polymer material in polymer layers 10.

During the process, polymer layers 10 melt or otherwise become flowable to wet out, fully permeate and/or encapsulate porous material layers 15. By using one or more such porous material layers 15 on each major surface and relying on the permeation effect described above, the resulting foam laminate product has energy management and/or energy management properties and/or stiffness which are desirable and these are achieved using a lesser amount of reinforcing material than is conventional.

Preferably, the heating step in the present process is conducted at a temperature of at least about 120° C., more preferably in the range of from about 100° C. to about 250° C., even more preferably from about 120° C. to about 250° C., most preferably from about 150° C. to about 220° C.

During the process, polymer layers 10 are physically transformed into the polymer substrate element of the cover layer of the present laminate product. The weight ratio of polymer layers 10 (aggregate weight-polymer substrate) to porous material layers 15 (aggregate weight) is greater than 2.5:1. Preferably, the weight ratio of polymer layers 10 (aggregate weight-polymer substrate) to porous material layers 15 (aggregate weight) is in the range of greater than 2.5:1 to about 6:1, more preferably in the range of from about 3:1 to about 6:1, even more preferably in the range of from about 3.5:1 to about 5.5:1, even more preferably in the range of from about 3.5:1 to about 5:1, even more preferably in the range of from about 3.5:1 to about 4.5:1. Most preferably, the weight ratio of polymer layers 10 (aggregate weight-polymer substrate) to porous material layers 15 (aggregate weight) is about 4:1.

Embodiments of the present invention will now be described with reference to the following Examples which are provided for illustrative purposes only and should not be used to limit or construe the invention.

EXAMPLES 1-5

In the Examples, the following materials were used (gsm—grams per square meter):

Core foam (thickness=8 mm)—Polyurethane foam having a density of 2.5 pounds per cubic foot—available from Woodbridge Foam Corporation under the tradenames Stratas 225™;

Polymer layer—HDPE (High Density PolyEthylene) film, with melting temperature of 128-135° C. and a thickness 1.5-3 mil;

Fibrous reinforcing layer #1—Basalt fiber veil 1-30 gsm available from Technical Fiber Products;

Fibrous reinforcing layer #2—Basalt fiber veil 2-50 gsm available from Crane Non-Wovens;

Fibrous reinforcing layer #3—Carbon/PET-20 gsm veil carbon:PET (70:30) available from Technical Fiber Products;

Fibrous reinforcing layer #4-34 gsm fiberglass veil available from Technical Fiber Products; and Fibrous reinforcing layer #5—Glass fibers (chopped)—continuous strand rovings available from Saint-Gobein Vetrotex Sheets of polymer layer and fibrous reinforcing layer were cut and alternately stocked on the both sides of the core foam as shown in FIG. 2 (i.e., 1 layer of fibrous layer interposed between 2 sheets of polymer layer) to form a stack or blank.

The specifics of each stack are set forth in Table 1. As will be apparent, Examples 2 and 5 had a weight ratio of polymer layer to fibrous reinforcing weight of 2.4:1 and 1:1, respectively. Accordingly, these Examples are provided for comparative purposes only.

For Examples 1-4, each stack was manually loaded and passed through a production Mayer Laminator, consisting of the adjacent heating zone and cooling zone. The process parameters for lamination were as follows:

conveyor speed: 7 m/min;
hot Platens temp.: 200° C.-225° C.;
pressure roller offset: 1.0 mm-1.5 mm; and
cold platens temperature: 20° C.

For Example 5, the polymer layers were run from rolls and the fiberglass was chopped in line between the film layering. The foam was placed in line between the top and bottom facing layers.

The resulting samples were conditioned for 24 hours.

Thereafter, the flexural properties of each sample were determined in accordance with ASTM D 790-98 (utilizing a three-point loading system). The conditions used during the testing were:

specimen dimensions: 50×150 mm;
cross head rate: 50 mm/min;
support points and loading nose had cylindrical shape and diameter of 20 mm; and
distance between support points (span): 100 mm.

The stiffness of the laminate product produced in each Example was determined by obtaining the slope (N/mm) of the load v. deflection curve. The results are reported in Table 1.

As can be seen from Table 1, use of 60% by weight of reinforcing layer (Example 1 compared to Example 2) resulted in an increase of stiffness of approximately 26%.

Further, the ratio of stiffness to weight of reinforcement more than doubled in Example 1 as compared to Example 2. These are highly surprising results.

A comparison of the results obtained in Examples 1, 3 and 4 show that the improved stiffness and stiffness to reinforcement weight ratio can be achieved with a number of different fibrous reinforcing material.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, if it is desired to produce the present laminate product from a molded foam core, this can be achieved by forming and shaping the cover layers from the stacks referred to in FIG. 2 independently of the foam core. The foam core could be molded independently of the cover layers (i.e., the conversion of the foamable composition to the foam core would be completed in a mold constraining all surfaces of the foam core) and the formed elements can then be adhered to each other with conventional adhesive. Further, it is possible to include a finishing or trim cover on one major surface of the present laminate product thereby producing a finished part. Still further, it is possible to add other elements to the foam laminate product during production thereof. For example, it is possible to incorporate one or more of: (i) an electrically conductive layer in the foam laminate product to provide a heating function, (ii) a sound absorbing layer to improve acoustical performance of the foam laminate product, and/or (iii) a flame retardant layer to improve flame retardant properties of the foam laminate. Still further, it is possible to subject the foam laminate product to a post-production step such as perforation to improve acoustical performance of the foam laminate product. It is therefore contemplated that the appended claims will cover any such modifications or embodiments.

All publications, patents, patent applications and subject matter on Internet website referred to herein are incorporated by reference in their entirety to the same extent as if each individual publication, patent or patent application was specifically and individually indicated to be incorporated by reference in its entirety.

TABLE 1

| Example | Fibrous Reinforcing Layer | Weight of Reinforcing Layer (gsm) ① | Weight of Polymer Layer (gsm) ② | ②:① | Stiffness ③ | ③/① |
|---|---|---|---|---|---|---|
| 1 | #1 | 60 | 240 | 4:1 | 21.0 | 0.35 |
| 2 | #2 | 100 | 240 | 2.4:1 | 16.7 | 0.17 |
| 3 | #3 | 40 | 240 | 6:1 | 17.5 | 0.44 |
| 4 | #4 | 68 | 240 | 3.5:1 | 22.8 | 0.34 |
| 5 | #5 | 215 | 200 | 1:1 | 28.0 | 0.13 |

What is claimed is:

1. A laminate product comprising:
    a pre-made flexible isocyanate-based foam core having a pair of opposed major surfaces; and
    a cover layer secured with respect to each major surface, the cover layer comprising a polymeric substrate and a fibrous fabric material,
    wherein a weight ratio of the polymeric substrate to the fibrous material is greater than 2.5:1,
    wherein the polymeric substrate is melted so as to substantially fully wet, fully permeate, and fully encapsulate the fibrous material, and wherein the laminate product has a stiffness-to-weight-of-the-fibrous material ratio greater than the stiffness-to-weight-of-the-fibrous material ratio of a control laminate product which has a 1:1 weight ratio of polymer substrate to fibrous material.

2. The laminate product defined in claim 1, wherein the foam core comprises an compression force deflection at 10% deflection in the range of from about 10 psi to about 80 psi when measured pursuant to ASTM 3574-D.

3. The laminate product defined in claim 1, wherein the foam core comprises a polyurethane foam.

4. The laminate product defined in claim 1, wherein the foam core has a substantially uniform density.

5. The laminate product defined in claim 1, wherein the foam core has a variable density.

6. The laminate product defined in claim 1, wherein the foam core has a density in the range of from about 2 to about 15 pounds per cubic foot.

7. The laminate product defined in claim 1, wherein the fibrous fabric material is in the form of a porous material layer.

8. The laminate product defined in claim 7, wherein the cover layer comprises from 2 to 15 porous material layers.

9. The laminate product defined in claim 7, wherein the cover layer comprises from 4 to 8 porous material layers.

10. The laminate product defined in claim 1, wherein the polymeric substrate comprises an organic polymer.

11. The laminate product defined in claim 1, wherein the polymeric substrate comprises a polyolefin.

12. The laminate product defined in claim 1, wherein the polymeric substrate comprises polyethylene.

13. The laminate product defined in claim 1, wherein the fibrous fabric material is selected from the group consisting of glass, basalt, carbon, polyester, ceramic polyamide, polyimide, rayon, metal alloys, mixtures of any of these copolymers of any of these, hybrids of any of these and interpenetrating networks of any of these.

14. The laminate product defined in claim 1, wherein the foam core comprises a thickness in the range of from about 4 mm to about 12 mm.

15. The laminate product defined in claim 1, wherein the polymeric substrate and the fibrous fabric material are present in a weight ratio in the range of from about 3:1 to about 6:1.

16. The laminate product defined in claim 1, wherein the polymeric substrate and the fibrous fabric material are present in a weight ratio in the range of from about 3.5:1 to about 5:1.

17. The laminate product defined in claim 1, wherein the polymeric substrate and the fibrous fabric material are present in a weight ratio in the range of from about 3.5:1 to about 4.5:1.

18. A vehicular headliner comprising the laminate product defined in claim 1.

19. The laminate product defined in claim 1, wherein the weight ratio of the polymeric substrate to the fibrous fabric material is less than 6:1.

20. The laminate product defined in claim 1, wherein each cover layer comprises a polymeric substrate on both opposing faces of the fibrous fabric material.

* * * * *